United States Patent [19]

Pennink, deceased

[11] Patent Number: 4,884,942
[45] Date of Patent: Dec. 5, 1989

[54] THRUST MONITORING AND BALANCING APPARATUS

[75] Inventor: Hans Pennink, deceased, late of Clinton Park, N.Y., by Liv Pennink, executrix

[73] Assignee: Atlas Copco Aktiebolag, Sweden

[21] Appl. No.: 285,710

[22] Filed: Dec. 16, 1988

Related U.S. Application Data

[63] Continuation-in-part of Ser. No. 879,970, Jun. 30, 1986, abandoned.

[51] Int. Cl.$^4$ .............................................. F01D 3/04
[52] U.S. Cl. ................................ 415/104; 415/107; 91/517
[58] Field of Search ................ 415/104, 105, 107, 96; 91/516, 517, 461

[56] References Cited

U.S. PATENT DOCUMENTS

| | | | |
|---|---|---|---|
| 3,411,349 | 11/1968 | Smith et al. ................ | 73/862.58 |
| 4,227,865 | 10/1980 | Erickson et al. ................ | 415/104 |
| 4,335,645 | 6/1982 | Leonard ................ | 91/461 |
| 4,350,078 | 9/1982 | Olofsson ................ | 91/461 |
| 4,437,307 | 3/1984 | Budzich ................ | 91/516 |
| 4,472,107 | 9/1984 | Chang et al. ................ | 415/104 |

FOREIGN PATENT DOCUMENTS

| | | | |
|---|---|---|---|
| 222099 | 3/1985 | Denmark ................ | 415/104 |
| 326302 | 12/1957 | Switzerland ................ | 415/110 |

*Primary Examiner*—Robert E. Garrett
*Assistant Examiner*—John T. Kwon
*Attorney, Agent, or Firm*—Wall and Roehrig

[57] ABSTRACT

Apparatus for automatically monitoring and adjusting the axial thrust acting upon the rotor assembly of a rotating machine having an adjustable balancing mechanism for balancing the axial load acting thereon. A pair of surfaces on the rotor structure and a pair of flow circuits are arranged to direct a pressurized fluid against each surface. The back pressure is each circuit is monitored to determine when the axial forces are unbalanced and the data applied to a control mechanism for automatically balancing the axial forces acting on the rotor structure.

14 Claims, 3 Drawing Sheets

THRUST MONITORING AND BALANCING APPARATUS

BACKGROUND OF THE INVENTION

This application is a continuation-in-part of prior U.S. patent application Ser. No. 879,970, filed June 30, 1986, now abandoned.

This invention relates to monitoring the axial loading upon the rotor assembly of a rotating machine and automatically adjusting the load to maintain the axial forces in a balanced condition while the machine is operating.

The term "rotating machine" as herein used shall include centrifugal compressors, pumps, turbines, turbo-expanders, and the like which contain a rotor assembly that is subjected to varying axial loads. Although rotor assemblies of this type generally contain a pair of opposed thrust bearings that are designed to resist axial forces, it has been found that the thrust bearings alone cannot completely absorb the entire load acting upon the structure without incurring high power losses and unbalanced rotor conditions.

As described in U.S. Pat. Nos. 3,828,160 and 3,895,689, which were issued to Swearingen, most thrust bearings typically involve a stationary component secured in the machine casing and a rotating or moving component that is secured to the rotor shaft. A lubricant or oil is introduced into the bearing gap separating the stationary and moving bearing components. As the machine approaches operational speeds, the oil forms a hydrodynamic wedge that resists to some extent axial shifting of the rotor and prevents the bearing components from rubbing under normal operating conditions.

As further disclosed by Swearingen in the above noted patents, a rotor balancing system is provided that offsets the axial thrust acting on the rotor of a centrifugal compressor to prevent damage to the bearings. The system includes a chamber formed in the machine casing that is closed against the impeller wheel by means of labyrinth seals. The chamber is connected to the suction side of the compressor and the compressed fluid is allowed to bleed back through the chamber to provide a resistive force against the impeller. This in turn prevents unwanted rotor shifting. A valve is positioned in the suction line of the Swearingen system to control the flow of fluid through the chamber. In addition, Swearingen controls the positioning of his valve by sensing the oil pressure in opposing thrust bearing used to support the rotor structure. Pressure taps are placed in the bearings and the pressure in each bearing is sensed. In one form of his invention, Swearingen connects his pressure taps to a controller which automatically adjusts the balancing chamber control valve setting.

Chang et al. in U.S. Pat. No. 4,472,107 describes an improvement of the Swearingen balancing system. In Chang, the pressure tap lines are connected over a piston. The piston, in turn, is connected either electrically, hydraulically or mechanically to a relatively complex valve arrangement which, as in Swearingen, controls the flow of working fluids through a balancing chamber. The pressure in the chamber is controlled so that the axial forces acting on the rotor are substantially balanced.

Both the Chang and the Swearingen systems are dependent upon bearing pressures to determine the position of the rotor, and accordingly, these systems are susceptible to any and all problems associated with thrust bearings. Excessive heating of the bearings will produce errors in pressure readings and thus adversely effect balancing conditions. Blockage of the lubricant flow passages can again produce erroneous pressure readings as can misalignment in the bearing components. Both the Chang and the Swearingen systems are capable of working well at operational speeds, however, little or no useful thrust information can be acquired by the balancing system at start up or at low operating speeds.

OBJECTS AND SUMMARY OF THE INVENTION

It is therefore an object of the present invention to improve apparatus for monitoring and automatically balancing the rotor structure of a rotating machine to compensate for varying axial loads.

A still further object of the present invention is to eliminate the need of acquiring load data from thrust bearing measurements when determining the operating conditions of a rotor assembly.

Another object of the present invention is to provide a fully automatic system for balancing the axial leading on the rotor structure of a rotating machine, regardless of the rotor speed.

Yet another object of the present invention is to eliminate uncontrollable variables in a rotor thrust measuring and balancing system.

A still other object of the present invention is to determine the positioning of a rotor assembly when the assembly is at rest or turning at relatively low speeds.

These and other objects of the present invention are attained by means of apparatus that includes a balancing mechanism acting upon the rotor assembly of a rotating machine, at least one radial surface on the rotor structure, a source of pressurized fluid, delivery line having a nozzle for applying the pressurized fluid against the surface to produce a back pressure in the delivery line which varies as the distance between the nozzle and the surface varies, a sensor for detecting the back pressure in the delivery line and a control mechanism responsive to the sensor for automatically adjusting the control valve of the balancing mechanism to maintain the back pressure in the delivery line at a level at which the axial loading acting on the rotor is balanced.

In one embodiment of the invention, a flange having two opposed radially extended surfaces is attached to the rotor for movement therewith. A pair of delivery lines are arranged to direct fluid axially against the opposed surfaces. A sensor is arranged to detect the pressure differences in the lines and automatically adjusts the control valve of the balancing mechanism to bring the pressure differential to a level of which the axial forces acting on the rotor are balance.

BRIEF DESCRIPTION OF THE DRAWING

For a better understanding of these and other objects of the present invention, reference is had to the following detailed description of the invention which is to be read in conjunction with the accompanying drawing, wherein.

DESCRIPTION OF THE INVENTION

Figure 1:
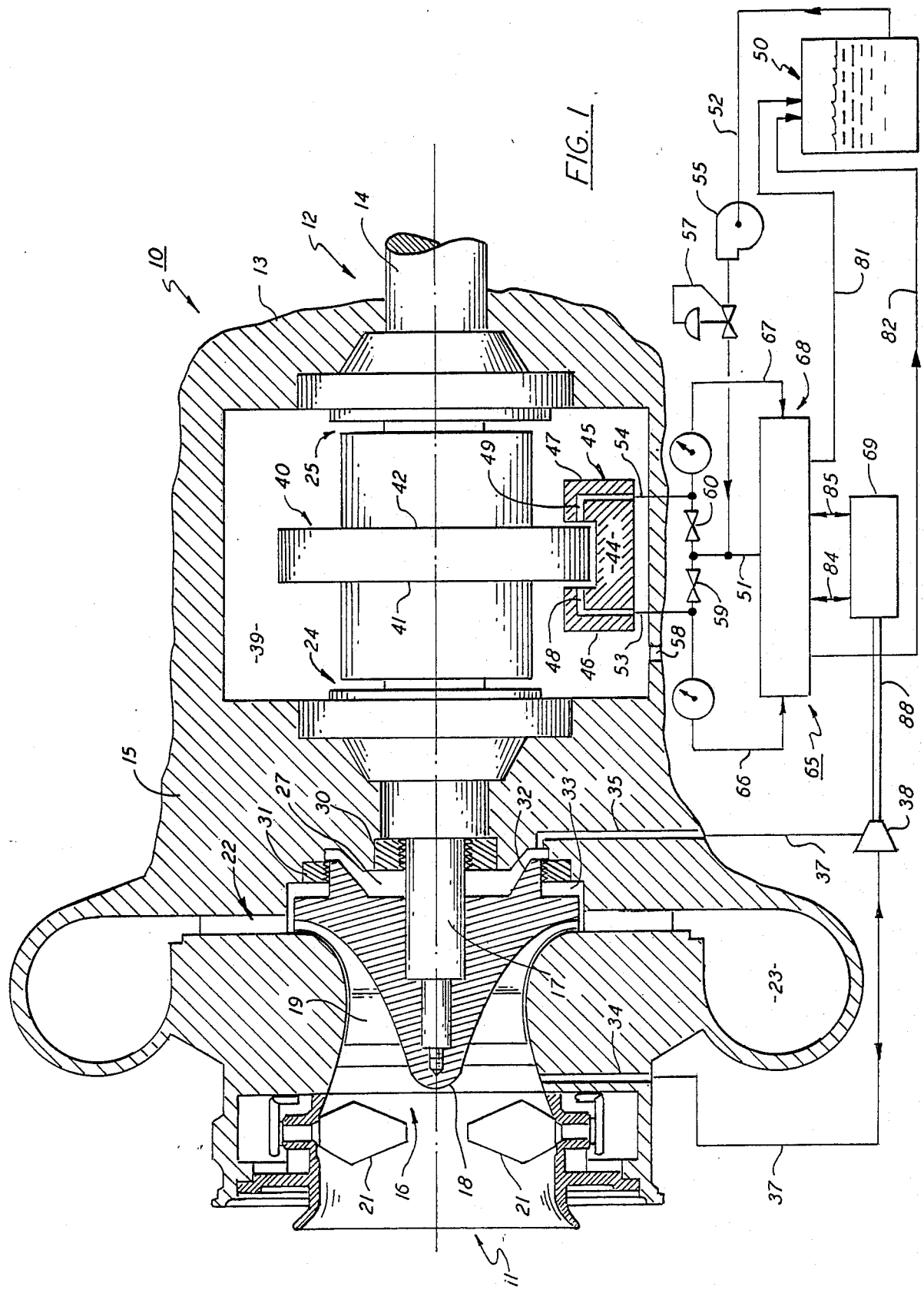
FIG. 1 is a partial side elevation in section of a centrifugal machine embodying the monitoring and load balancing system of the present invention.

Referring initially to FIG. 1, there is shown a rotating machine, generally referenced 10, which in this case, is a centrifugal compressor used to raise the pressure of a working fluid as the fluid enters the machine through a suction inlet 11. Although the present invention will be described with specific reference to a centrifugal compressor, it should become apparent to one skilled in the art that the invention can be employed in many similar types of rotating machines such as centrifugal pumps, turbines, turbo-expanders and the like. The machine includes a rotor assembly 12 that is rotatably supported within the machine casing 13 by suitable bearings, some of which have been omitted for the sake of clarity.

Rotor shaft 14 is positioned along the horizontal axis of the machine and passes through the front section 15 of the casing 13. An impeller wheel 16 is secured to the front end 17 of the shaft by any suitable means. The impeller includes a hub 18 that supports a series of spaced apart blades 19—19. The blades are arranged to establish restricted flow passages which turn the working fluid in a generally radial direction and compresses the fluid to a higher pressure. The compressed fluid is discharged from the tips of the blades into a diffuser section generally depicted at 22. The diffuser surrounds the impeller wheel and functions to redirect discharged fluid into a toroidal-shaped volute 23 which, in turn, conducts the fluid out of the machine. Inlet guide vanes 21—21 are adjustably positioned at the entrance to the impeller for controlling the inflow of working fluid into the machine.

The general construction of a centrifugal compressor is well known in the art and, for this reason, the structure of the machine is shown in a somewhat simplified or schematic form in FIG. 1. The machine is meant to be merely illustrative of many types of rotating machines and not meant to limit the disclosure in any way. Rotor assembly 12 includes a pair of conventional thrust bearings 24 and 25 that help support the assembly to some extent and also resist axial loads acting on the assembly. The loading, however, can at times exceed the bearing capacity whereupon the rotor structure will shift slightly in an axial direction in response to the unbalanced condition. As explained in the noted Swearingen patents, an adjustable balancing system is oftentimes used to offset the unbalancing forces acting on the rotor structure and thus prevent overheating and bearing loss.

As illustrated in FIG. 1, a balancing chamber 27 is located in the front wall of the machine casing adjacent to the vertical back wall of the impeller wheel. The inner section of the chamber is closed by a seal 30 against the rotor shaft 14. A labyrinth seal 31 encircles the outer periphery of the chamber and acts upon an annular shoulder 32 formed in the back wall of the impeller wheel. A portion of the high pressure fluid leaving the tip of the impeller is permitted to bleed back through seal 31 into the balancing chamber through passage 33. This high pressure fluid in the chamber exerts a force on the back of the wheel and thus resists thrust loads that might tend to unbalance the system. The fluid in the chamber is returned to the suction or inlet side of the impeller via bleed line 37 and a pair of channels 34 and 35 formed in the casing. An adjustable control valve 38 is operatively connected into the bleed line, and as will be explained in greater detail below, the valve setting is automatically adjusted to regulate the working fluid to the compressor inlet and control the fluid pressure in the balance chamber.

The mid-section of the rotor shaft is situated in a fluid tight bearing chamber 39 and is provided with a radially disposed flange 40 having a pair of vertically disposed faces 41 and 42 which are both flat and parallel. A U-shaped gaging block 45 is positioned adjacent to the outer periphery of the flange and includes vertically extended arms 46 and 47. The arms extend upwardly from base 44 adjacent to and in close proximity with the opposed end face on the flange. Delivery lines 53 and 54 are partially contained within the block. The delivery lines connect into a crossover line 51. Discharge port or nozzles 48 and 49, located at the distal ends of the delivery lines are provided in the upraised arms of the gauge block and are arranged to direct high pressure fluid against the opposed end faces 41 and 42 of the flange. The gauge block is mounted in the machine casing and, although not shown, the block can be adjusted to locate the nozzles of the delivery line a desired distance from the adjacent end face of the flange. Identical flow restrictors 59 and 60 are placed in the lines upstream from the nozzle to insure that fluid moving in each line toward the nozzle will be at the same pressure.

A fluid reservoir 50 is connected to the crossover line 51 by a supply line 52. A pump 55 and a pressure regulator 57 are operatively connected to supply line 52 and function to supply fluid from the reservoir to the delivery lines at a predetermined pressure and rate. High pressure fluid used in the system may be drawn from the same reservoir used to supply lubricant to the thrust bearings or, as here, from an independent reservoir. The fluid collected in bearing chamber 39 is returned to the reservoir by means of a drain 58 or any other suitable type return system.

In practice, the opposed surfaces of the flange act as restrictions in the two delivery lines to produce a given back pressure in each delivery line behind the discharge nozzle which is dependent upon the distance that the nozzle is positioned from the restriction. The present apparatus is arranged so that the back pressure in the delivery lines is the same when the axial forces acting on the rotor are balanced. The pressure differential can, however, be set at some given value when the rotor is balanced without departing from the teachings of the present invention. Any axial shifting of the rotor will produce a discernable change in the back pressure differential. Back pressure data concerning each delivery line is transmitted in this embodiment of the invention to a servo-amplifier, generally referenced 65, by means of sensing lines 66 and 67. The servo amplifier includes a pilot valve unit 68 and a co-acting drive cylinder 69 that amplifies the pressure differential signal. The drive cylinder is connected to the balancing chamber control valve 38.

The operation of the servo-amplifier 65 will be explained in greater detail with specific reference to FIGS. 2 and 3. The pilot valve 68 is shown in a neutral position in FIG. 2. This indicates that the back pressure differential over the two delivery lines is equal to zero and the forces acting on the rotor assembly are therefore balanced. The pilot valve includes a cylindrical housing 70 that slidably contains an assembly containing two outer pistons 71 and 72, and two inner pistons 73 and 74. The pistons in the assembly are all joined to a centrally located tie rod 75 so that lateral displacement of the rod will cause the pistons to move in unison without changing their relative positions.

The pilot piston assembly divides the cylinder into five individual compartments that include two end compartments 76 and 77, two intermediate compartments 78 and 79, and a central compartment 80. High pressure fluid from pump 55 (FIG. 1) is delivered into the central compartment 80 via feed line 51. The two intermediate compartments are arranged to empty directly into fluid drain lines 81 and 82 which conduct fluid from these compartments directly back to the reservoir 50. Back pressure sensing lines 66 and 67 enter directly into the two end compartments 76 and 77, respectively, through opposing end walls of the housing. Springs 83—83 are located in each end compartment and act upon the piston assembly to normally hold the assembly in the neutral position as shown in FIG. 2. A pair of connecting lines 84 and 85 operatively connect the power cylinder to the pilot valve. When the pilot valve is in a neutral position, the two inner pistons 73 and 74 close off the connecting lines 84 and 85 thus shutting off the flow of fluid between the pilot valve and the power cylinder 69.

A power piston 87 is slidably mounted within the power cylinder and is operatively connected to the balancing chamber control valve 38 by means of piston rod 88. The control valve 38, in this embodiment of this invention, is a plug valve having a tapered plunger 89 connected to rod 88. The plunger co-acts with a tapered valve seat 90 to regulate the flow of working substance passing from the balancing chamber back to the inlet region of the rotating machine. By adjusting the position of the plunger, the pressure of the working fluid in the chamber can be controlled to apply a controlled balancing force on the rotor structure.

When the rotor is turning under balanced conditions, the power cylinder is isolated from the pilot valve and the control valve will remain in a set position. If the rotor becomes unbalanced, however, the back pressure in the flow circuits will become similarly unbalanced. This produces greater pressure acting upon one side of the pilot valve piston assembly causing the assembly to move axially in response to the pressure. As will be explained below, this permits high pressure fluid stored in center compartment 80 to flow into the power cylinder to adjust the positioning of the control valve.

Figure 3:
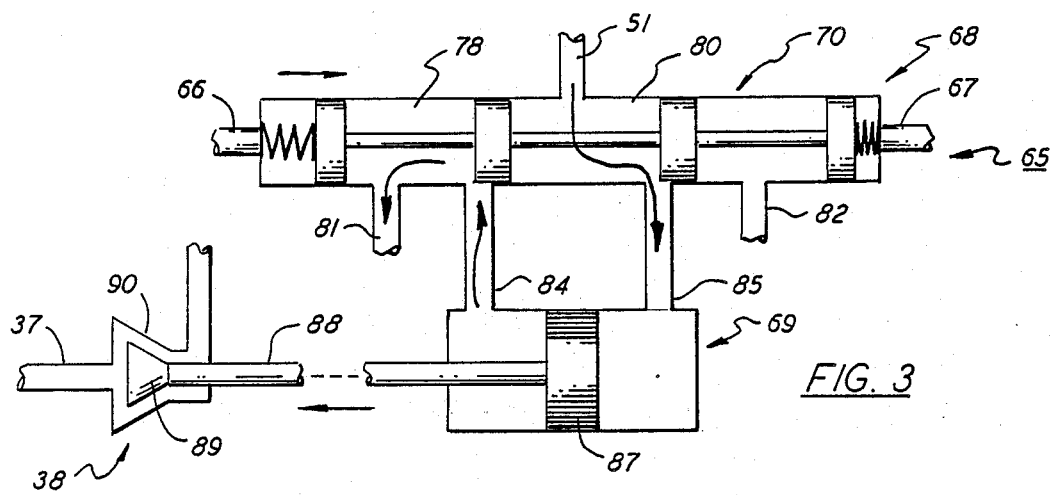
FIG. 3 is a view similar to that shown in FIG. 2 illustrating the servo-amplifier moved to an operative position for adjusting the balancing forces acting on the rotor structure of the centrifugal machine.

In FIG. 3, the pilot valve piston assembly is shown displaced to the right indicating that an unbalancing force is acting on the rotor assembly tending to move the assembly to the left as viewed in FIG. 1. At this time, connecting lines 84 and 85 are both opened. Line 85 allows high pressure fluid to flow into the drive cylinder behind power piston 87 thus driving the piston to the left. Fluid contained in the cylinder in front of the piston is simultaneously forced via connecting line 84 through intermediate compartment 78 into drain line 81 for return to the reservoir. Movement of the power piston automatically causes the control valve 38 to be repositioned. Although the control valve may be of any suitable type, the valve as illustrated in this particular embodiment of the invention is a plug valve which includes a tapered plunger 89 that is adapted to coact with a complementary valve seat 90 to regulate the flow of working fluid through the valve. The plunger is connected to the piston rod 88 so that it moves in response to the displacement of the power piston.

As can be seen, displacing the piston to the left as indicated in FIG. 3 causes the control valve to be moved to a more fully opened condition. This, in turn, reduces the chamber pressure acting against the impeller wheel thus alleviating the unbalanced condition. When the axial load acting on the rotor assembly reaches a balanced condition, the pilot valve returns to a neutral position and will remain in this position until further corrections are called for. It should be evident from the disclosure above that any unbalancing forces acting in the opposite direction will cause the piston assembly of the pilot valve to move in the opposite direction. High pressure fluid is now applied to the front of the power piston causing the control valve 37 to be moved to a more fully closed position to increase the pressures in the balancing chamber again balancing the axial load on the rotor structure.

The present balancing system has the ability to immediately sense changes in the axial loading on the rotor assembly and automatically take appropriate corrective action to bring the axial loading to a balanced condition. The system operates independently of the thrust bearing and thus is not adversely effected by bearing related problems as are other balancing systems found in the prior art. As should now be apparent the presented system also has the ability to determine the rotor thrust load and/or rotor position when the rotor is at standstill or turning at a relatively slow speed. These measurements can be used to control axial lift off as the rotor is brought up to operating speeds. Although the main embodiment of the invention has been explained in conjunction with a radially extended flange having opposed flow restricting surfaces, the flow circuits can be adapted to act against grooves formed in the rotor or any other suitable type of flow restricting surface through back pressure readings in the delivery line. For example, the bearing thrust faces on the rotor shaft could be extended beyond the hydrodynamic film area and similarly used to accept the discharge from the flow circuits without effecting the bearing performance or being subjected to bearing defects. Although the sensing surfaces are shown in the main embodiment of the invention as being perpendicularly aligned in regard to the axis of the rotor, these surfaces can be inclined at a suitable angle with respect to the axis of the rotor without departing from the teachings of the invention. Furthermore, the pilot valve can also be adapted to provide high pressure fluid directly to either side of a balancing piston which also acts upon the rotor to vary the axial load in either direction. To this end, the amplifier 69 as seen in FIGS. 3 and 4 is modified by removing the piston rod 88 and connecting the piston directly to the rotor so that the piston exerts an axial pressure on the rotor in either direction.

Figure 2:
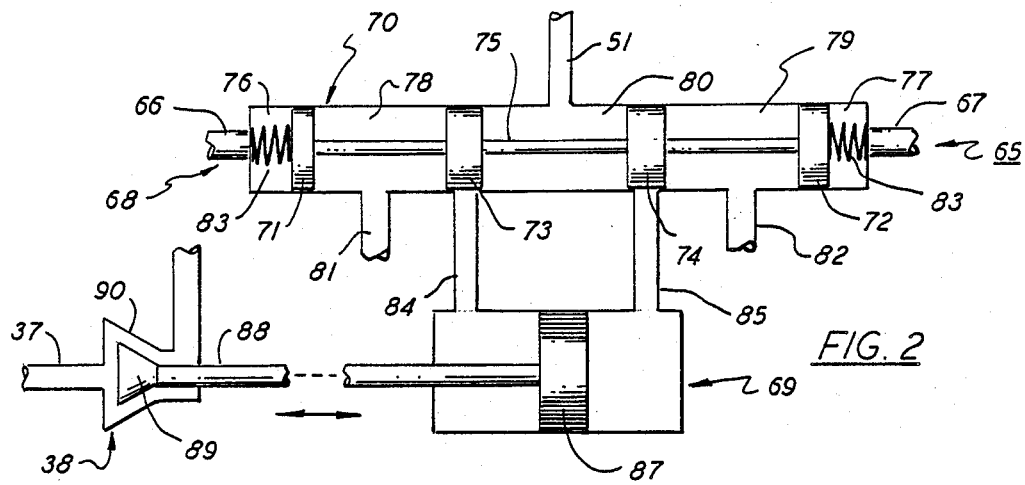
FIG. 2 is an enlarged diagrammatical view of a servo-amplifier used in the control section of the centrifugal machine illustrated in FIG. 1 further showing the servo-amplifier in a neutral position.
Figure 4:
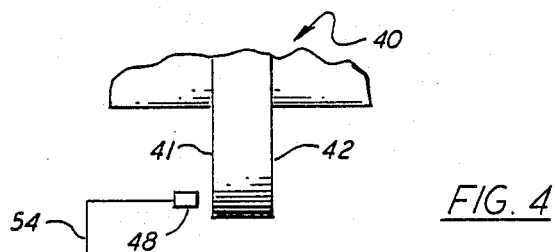
FIG. 4 is a partial view showing a second embodiment of the present invention.
Figure 4:
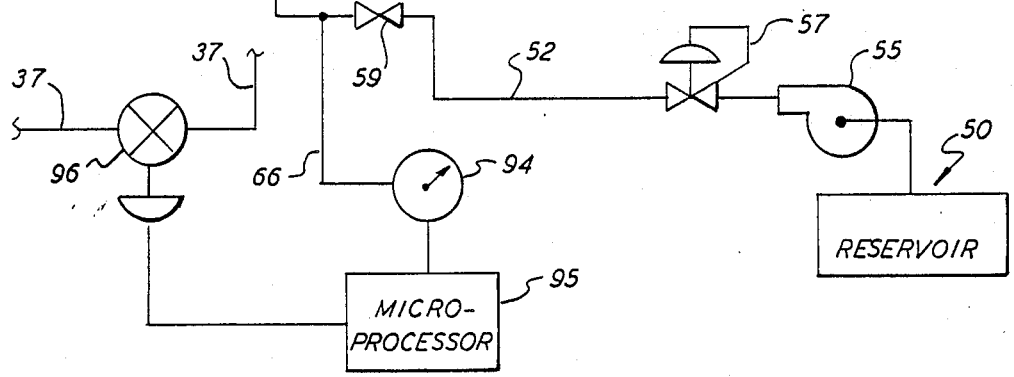

A second embodiment of the invention is illustrated in FIG. 4 where like numbers depict like parts as those previously described in association with FIGS. 1-3. In this embodiment of the invention, a single delivery line 54 is employed to apply high pressure fluid to one side 41 of the rotating flange 40. The back pressure in the delivery line is monitored by a pressure sensing line 66 that feeds pressure information to a measuring device 95 which is arranged to convert the information into an electrical output signal indicative to the sensed pressure. The output signal is fed to a micro-processor that is programed to control the opening and closing of an electrically operated control valve 96 in the bleed line 37 of the balancing system. The micro-processor is programmed to maintain the back pressure in the delivery line at a predetermined value which indicates a balanced rotor condition.

Figure 5:
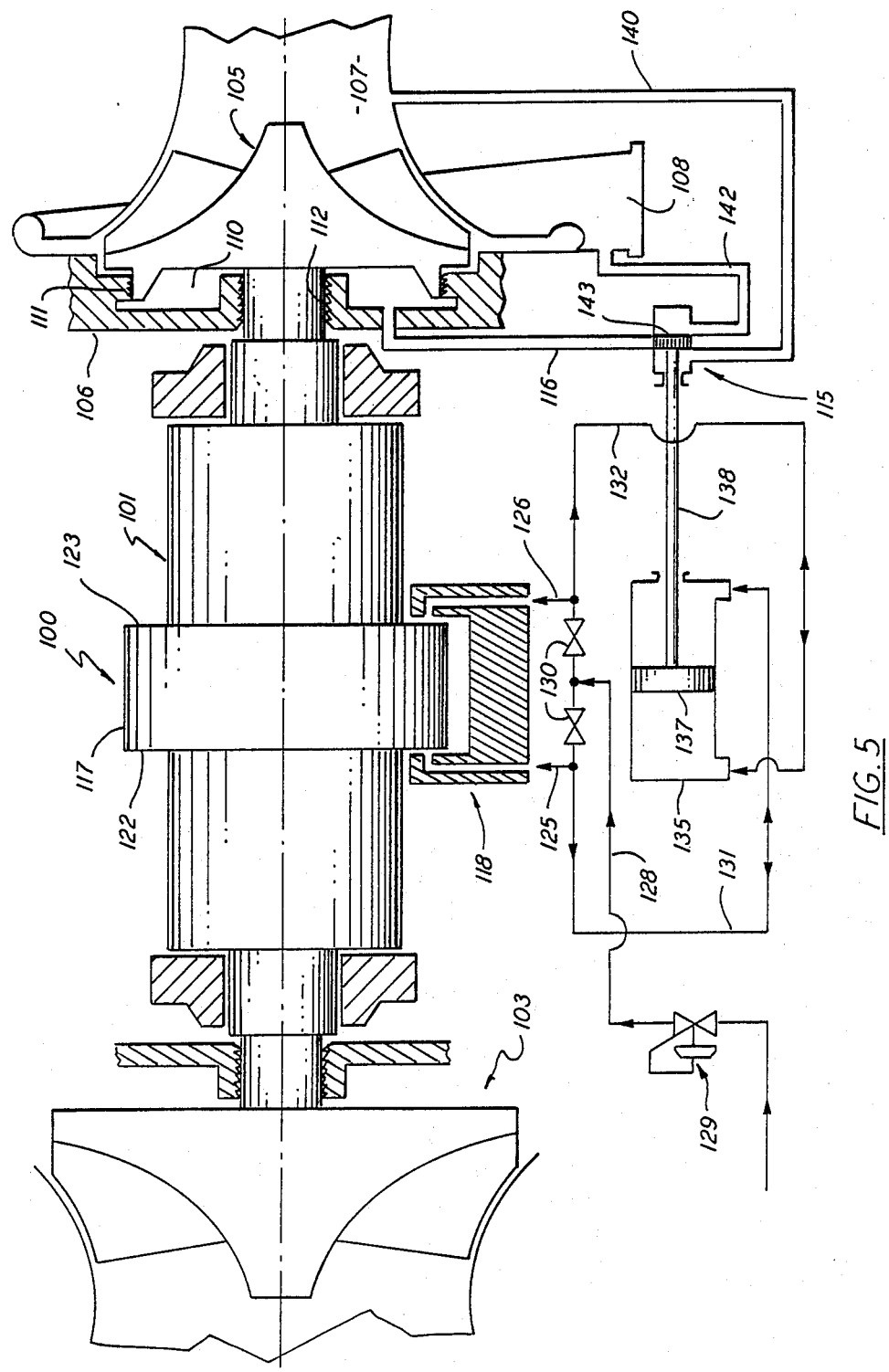
FIG. 5 is a side elevation in partial section showing a third embodiment of the present invention that employs a simplified control system.

Turning now to FIG. 5, there is shown a further embodiment of the present invention wherein 100 is a rotor assembly that includes a shaft 101 for supporting a turbine wheel 103 and a compressor wheel 105 on opposite ends thereof. The rotor assembly is mounted in suitable bearings in a stationary machine casing 106. A working fluid is introduced into the compressor wheel through suction inlet 107 and discharged at a higher pressure through diffuser discharge 108. A balancing chamber 110 is formed in the casing behind the compressor wheel and the chamber is closed as explained above by means of labyrinth seals 111 and 112. The balancing chamber is connected to a control valve 115 by line 116.

A radial extended flange 117 is mounted upon the shaft 101 and a gage block 118 is positioned so that discharge ports are located at the opposing side walls 122 and 123 of the flange. The flange again serves as a restriction in opposing flow circuits 125 and 126.

Lubricant or any other suitable fluid is delivered from a reservoir via supply line 128 into the two flow circuits. A pressure regulator 129 is contained in the supply line. In addition, a flow restrictor 130 is placed in each delivery line so that the pressure in each delivery line in front of the restrictors is substantially equal. Sensing lines 131 and 132 are connected at one end into the delivery lines between the flow restrictor and the discharge ports of the delivery lines and at the other end to a power cylinder 135. The sensing line from delivery line 125 is connected into the back side of the power cylinder while feed line 126 is connected into the front of the power cylinder.

A piston 137 is slidably retained in the cylinder and is arranged to move in response to changes in pressure between the two lines. The piston is coupled to the balancing chamber control valve by rod 138. The valve is arranged to accept a first input from the suction end of the compressor via first input line 140 and a second input from the compressor discharge through second input line 142. A valve gate 143 is attached to the piston rod and is repositioned in the valve in response to movement of the power piston.

In the event the axial loading on the rotor shifts the rotor to the right as viewed in FIG. 5, the back pressure in flow circuit 126 will increase. This causes the power piston to move to the right which in turn exposes the balancing chamber to the inlet side of the compressor. As a result, high pressure working fluids are pulled into the balancing chamber through the labyrinth seals at an increased rate to increase the chamber pressure whereby the rotor is returned to a balanced condition. Similarly, if the rotor shifts to the left, the power piston will be shifted to the left also, thereby exposing the balancing chamber to the higher compressor discharge pressures. This in turn reduces the flow of working fluid through the chamber whereupon the rotor will move back into a balanced condition.

As can be seen in this embodiment of the invention, the control equipment has been greatly simplified without sacrificing operational efficiency and at the same time avoiding the problems associated with balancing systems that rely upon thrust bearing assemblies to furnish information concerning axial loading.

While this invention has been described with specific reference to the details set forth above, it is not confined to those details and the application is intended to cover any modification or changes as may come within the scope of the following claims.

What is claimed is:

1. Control apparatus for use in a rotating machine of the type having a balancing chamber containing a pressurized fluid that acts against a rotor assembly and an adjustable control valve for increasing or decreasing the pressure in said chamber, said apparatus including
   a first delivery line having a discharge nozzle for directing a first fluid stream axially against one surface on the rotor assembly,
   a second delivery line having a discharge nozzle for directing a second fluid stream axially in a direction opposite said first stream against another surface of said rotor assembly,
   sensing means for detecting the difference in pressure in the first and second delivery lines behind each nozzle
   adjusting means that is responsive to said sensing means for positioning the adjustable control valve to automatically maintain said difference in pressure at a given value at which the axial forces acting on the rotor assembly are balanced.

2. The control apparatus of claim 1 that further includes a drive cylinder slidably containing a piston therein, means to connect said piston to the control valve whereby the position of the valve is set in response to the position of the piston, a first sensing line for connecting one end of said drive cylinder to the first delivery line immediately behind said nozzle, and a second sensing line for connecting the other side of the drive cylinder to the second delivery line immediately behind the nozzle whereby said control valve is opened or closed when the pressure differential in the delivery lines is different than said given value.

3. The control apparatus of claim 2 that further includes an amplifier means operatively connected between the sensing lines and the drive cylinder for uniformly increasing the pressure on either side of the piston.

4. The control apparatus of claim 1 that further includes regulator means for maintaining the fluid pressure supplied to both delivery lines at the same pressure valve.

5. The control apparatus of claim 1 wherein the rotor structure includes a radially disposed flange means and the nozzles of the discharge lines are arranged to direct fluid on opposing surfaces of said flange means.

6. The control apparatus of claim 5 wherein the nozzle ends of the discharge lines are secured in a common gage block means so that the nozzles direct fluid against opposite sides of the flange.

7. The control apparatus of claim 6 wherein the gage block means is arranged so that the sensed pressure differential in the delivery lines is zero when the coaxial forces acting upon the rotor assembly are balanced.

8. A method of automatically adjusting the control valve of a balancing chamber to increase or decrease the chamber pressure acting on a rotor assembly of a rotating machine that includes the steps of directing a stream of fluid from the nozzle of a delivery line axially against a surface on the rotor assembly so that the back pressure in said delivery line behind the nozzle varies with respect to the distance the nozzle is positioned from said surface, measuring the back pressure in the discharge line, and adjusting the control valve setting to maintain the back pressure at a predetermined level at which the axial forces on the rotor are balanced.

9. The method of claim 8 that includes the further step of directing a stream of fluid from a nozzle of a second delivery line in the opposite direction against a second surface on the rotor so that the back pressure in the second line behind the nozzle also varies with respect to the distance said nozzle is positioned from said second surface, measuring the back pressure in the second line, determining the difference between the two measured back pressures, and adjusting the control valve in response to the pressure difference to maintain the difference at a value at which the axial forces acting on the rotor are balanced.

10. The method of claim 8 that includes the further step of supplying fluid to each delivery line at the same pressure.

11. The method of claim 10 that includes the further step of setting each nozzle at the same distance from a rotor surface so that the difference in back pressure is zero when the axial forces acting on the rotor assembly are balanced.

12. Control apparatus for use in a rotating machine of the type having a balancing chamber containing a pressurized fluid that acts against a rotor assembly and an adjustable control valve for increasing or decreasing the pressure in said chamber, said control apparatus including a delivery line having a discharge nozzle for directing a fluid stream axially against a surface on the rotor assembly so that the back pressure in the delivery line will varies as the distance between the nozzle and the surface varies, sensing means for measuring the back pressure in the delivery line behind the nozzle, adjusting means for opening and closing the control valve in response to the sensed back pressure to maintain the sensed back pressure at a level at which the rotor assembly is balanced.

13. The apparatus of claim 12 that further includes a supply means for providing fluid to the delivery line at a uniform pressure level.

14. The apparatus of claim 12 wherein said control valve is electronically controlled and further including a processor means for comparing the measured back pressure to a given pressure at which the rotor forces are balanced and automatically adjusting the valve to maintain the measured pressure equal to the given pressure.

* * * * *